United States Patent Office 3,651,086
Patented Mar. 21, 1972

3,651,086
5-AMINOMETHYL-4,5,6,7-TETRAHYDRO-4-OXOINDOLES
Irwin J. Pachter, 42 Juneau Blvd., Woodbury, N.Y. 11797, and Karl Schoen, 83—36 Beverly Road, Kew Gardens, N.Y. 11415
No Drawing. Application Sept. 1, 1967, Ser. No. 664,942, which is a continuation of applications Ser. No. 575,303, Aug. 26, 1966, and Ser. No. 599,387, Dec. 6, 1966. Divided and this application July 15, 1968, Ser. No. 768,566
Int. Cl. C07d 27/54
U.S. Cl. 260—326.15     4 Claims

ABSTRACT OF THE DISCLOSURE

Process for preparing 2-aminoalkyl pyrrol-3-yl ketones and derivatives thereof, and oxoindoles thus produced. The process is carried out by quaterizing 2-dimethylamino- or 2-piperidino-alkyl-pyrrol-3-yl ketones or derivatives thereof, including those having bi- and tricyclic nuclei, and reacting the quaternary salts either with a base and an amine or, alternatively, with an amine only.

CROSS REFERENCE TO OTHER APPLICATIONS

This application is a division of application Ser. No. 664,942, filed Sept. 1, 1967 and now abandoned, which application was in turn a continuation-in-part of our copending applications Ser. No. 575,303, filed Aug. 26, 1966 and now abandoned, and Ser. No. 599,387, filed Dec. 6, 1966 and now abandoned. Certain of the compounds disclosed herein are described in our copending applications Ser. No. 403,387, filed Aug. 12, 1964 and now Pat. No. 3,410,857 issued Nov. 12, 1968, and Ser. No. 357,284, filed Apr. 3, 1964 and now abandoned.

BACKGROUND OF THE INVENTION (1) Field of the invention

This invention relates to novel compounds which are useful as tranquilizers, anti-depressants and analgetics.

(2) Description of the prior art

Various compounds within the following class are known and have been described, for example, in our above-noted copending applications.

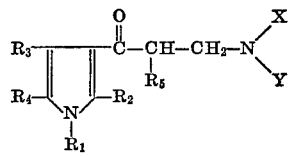

FORMULA A

In the above formula:
$R_1$ designates hydrogen, a lower alkyl group having a maximum of 6 carbon atoms, phenyl, phenyl alkyl (where the alkyl group has up to 3 carbons), substituted phenyl or substituted phenyl-lower alkyl in which the substituent on the phenyl ring is halogen, lower alkyl, i.e., wherein the alkyl group has not more than 4 carbon atoms, lower alkoxy of not more than 4 carbon atoms, halogenated alkyl or not more than 4 carbon atoms, or 2-, 3- or 4-pyridiyl;

$R_2$, $R_3$ and $R_4$ designate hydrogen alkyl, alkenyl or cycloalkyl having a maximum of 8 carbon atoms, phenyl, halo-phenyl, (lower alkoxy)-phenyl, thienyl, furyl, or benzyl;

$R_3$ and $R_4$ may be linked to constitute an alicyclic ring having a maximum of 8 carbon atoms;

$R_5$ designates hydrogen, alkyl, alkenyl or cycloalkyl, all having a maximum of 8 carbon atoms, phenyl or benzyl; and $R_2$ or $R_3$ may be linked with $R_5$ to constitute alicyclic rings having a maximum of 8 carbon atoms, those rings formed by linking $R_2$ and $R_5$ optionally being substituted by alkyl groups having 1-4 carbon atoms and those rings formed by linking $R_3$ and $R_5$ optionally being substituted by an alkyl or alkylidene group having 1-4 carbon atoms, a benzylidene or a benzyl group.

X and Y are each the same or different and are hydrogen, lower alkyl, lower alkynyl, lower alkenyl, cycloalkyl, bicycloalkyl, hydroxy-lower alkyl, alkoxy-lower alkyl, lower dialkylamino, lower acyloxyalkyl, carbamoyloxy-lower alkyl, phenyl-lower alkyl, heteroaromatic-lower alkyl, heteroaryl and saturated heteroaryl, and wherein X and Y may be linked, and when linked constitute a heterocyclic ring of not more than eight members.

Some of the compounds embraced within the scope of general Formula A, as set forth above, have heretofore been prepared, or may be prepared, through the Mannich reaction of the corresponding pyrrol-3-yl ketone with formaldehyde or a formaldehyde-yielding substance, e.g., paraformaldehyde, and a base X—NH—Y as set forth in the following reaction scheme:

REACTION SCHEME I

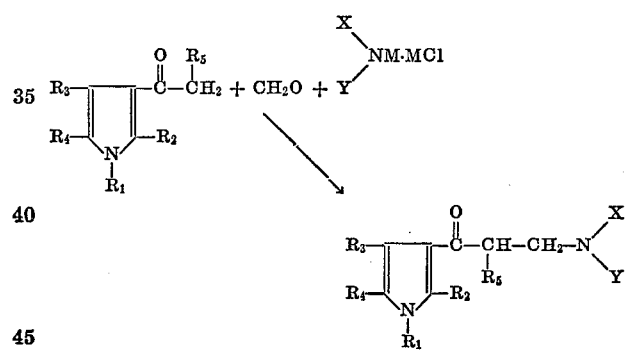

Resonance interaction of the electron-rich pyrrole ring with the ketone carbonyl in the pyrrole ketones renders these less reactive than structurally related aromatic ketones such as phenyl ketones and naphthyl ketones. One result of such lower reactivity is that the Mannich reaction proceeds very slowly with many of the important bases X—NH—Y or their corresponding salts. It has been found that side reactions occur during the prolonged reflux periods necessary for complete reaction; and frequently there are produced dark products which are difficult to purify.

Of the various Mannich reactions carried out, those with dimethylamine hydrochloride proceed most rapidly with better yield and with higher purity. However, it has not been possible to produce primary or secondary amino alkyl ketones by the method of Reaction Scheme I, that is to say, compounds of general Formula A herein wherein the moieties X and Y may either or both be hydrogen.

Compounds where X and/or Y are lower alkynyl, lower alkenyl, cycloalkyl, alkoxy-lower alkyl, lower dialkylamino, heteroaromatic lower alkyl, heteroaryl and saturated heteroaryl have not been disclosed heretofore.

SUMMARY OF THE INVENTION

We have discovered that it is advantageous in the preparation of pure products of Formula A in high yield to use as starting materials compounds of the following formula:

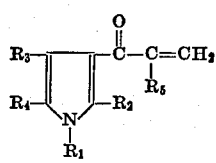

FORMULA B

Compounds of Formula B can be conveniently produced from quaternized salts of the dimethylamine Mannich bases of Formula A by splitting off therefrom, under alkaline conditions, the tertiary amine moiety.

Thus, it can be generalized that the dimethylamine Mannich bases can constitute the starting materials for the preparation of Mannich bases having a different amino function from that of starting compound A.

Illustrative of our process is the sequence of steps just mentioned and set forth below:

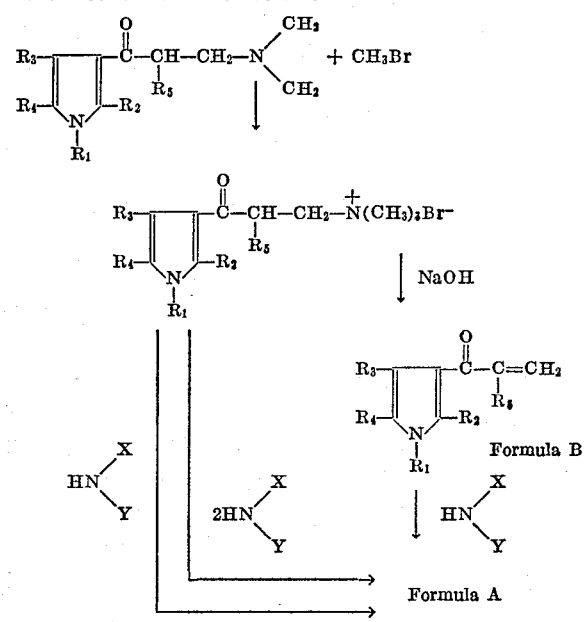

REACTION SCHEME II

In accordance with such process, which is the subject of our copending application Ser. No. 768,569 filed July 16, 1968, the dimethylamine Mannich base is quaternized with an alkyl halide or sulfate suitably a lower alkyl halide or sulfate, such as methyl-, ethyl- or propyl-bromide, chloride, iodide, or sulfate, and the resulting quaternary salt is treated with aqueous alkali, suitably aqueous sodium or potassium hydroxide, to produce the stable methylene derivative.

Upon interaction of the methylene compound with a new base there is produced a final product of good quality and in high yield.

The success of such process is a consequence of the unusual stability of the methylene compounds of the Formula B (in which the symbols $R_1$ to $R_5$ have the same meaning as in Formula A). The compounds of Formula B are more resistant to polymer-forming side reactions than are structurally comparable aryl derivatives such as the acrylophenones.

The novel compounds of present invention are those of Formula A wherein the moiety X and/or Y are hydrogen, which could not be satisfactorily prepared by the method of Reaction Scheme I. The present invention further includes compounds wherein X and/or Y are lower alkynyl, lower alkenyl, cycloalkyl, alkoxy-lower alkyl, lower dialkylamino, heteroaromatic-lower alkyl, heteroaryl and saturated heteroaryl.

More particularly, the novel compounds within the scope of the present invention are those of the formula:

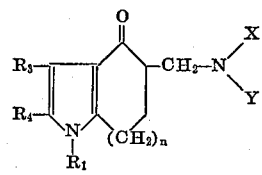

FORMULA A-1 wherein $n$ is 0, 1, 2 or 3; $R_1$, $R_3$ and $R_4$ are hydrogen or lower alkyl; X is hydrogen, lower alkyl, hydroxy-lower alkyl, lower acyloxyalkyl, carbamoyloxy-lower alkyl, phenyl lower alkyl, cycloalkyl, lower alkenyl, lower alkynyl, di-(lower alkyl) amino, a heterocyclic radical or a heterocyclo lower alkyl radical; and Y is hydrogen, cycloalkyl, lower alkenyl, lower alkynyl, di(lower alkyl) amino, a heterocyclic radical or a heterocyclo lower alkyl radical.

The compounds of the foregoing formula have central nervous system activity; and are particularly useful as tranquilizers, ataractics, and sedatives. They are also useful as analgetics and anti-depressants.

The compounds may be administered at dosage levels of about 0.07–3 mg./kg., preferably between 0.7–1.8 mg./kg. daily. A compound prepared by the process described herein showed marked antipsychotic activity in humans when administered at the preferred level—i.e., 50–125 mg. per patient daily. Chronic schizophrenic male patients showed improvement in disorientation, thinking and perceptual distortion as well as in schizophrenic disorganization and social competence.

THE PREFERRED EMBODIMENTS OF THE INVENTION

In the preferred embodiments of the present invention, in the Formula A–1, $R_1$ is hydrogen or a lower alkyl group such as methyl, ethyl, propyl, butyl or hexyl; and $R_3$ and $R_4$ are alkyl groups, suitably lower alkyl radicals such as methyl, propyl, butyl or hexyl.

X may be hydrogen; lower alkyl such as methyl, ethyl, butyl, pentyl, hexyl or heptyl; hydroxy-lower alkyl; lower acyloxy-alkyl, suitably lower alkanoyloxy-lower alkyl; carbamoyloxy-lower alkyl; phenyl lower alkyl; cycloalkyl suitably cyclo-lower alkyl such as cyclopropyl, cyclobutyl, cyclopentyl, cyclohexyl or cyclooctyl; lower alkenyl, such as propenyl, butenyl or hexenyl; lower alkynyl, such as propynyl, butynyl or pentynyl; di-(lower alkyl) amino, such as dimethylamino; or heterocyclic or heterocyclo lower alkyl.

Y may be hydrogen, cycloalkyl suitably cyclo-lower alkyl such as cyclopropyl, cyclobutyl, cyclopentyl, cyclohexl or cyclooctyl; lower alkenyl, such as propenyl, butenyl or hexenyl; lower alkynyl, such as propynyl, butynyl or pentynyl; di-(lower alkyl) amino, such as dimethylamino; or heterocyclic or heterocyclo lower alkyl radicals.

When either X or Y is heterocyclic radical or a heterocyclic moiety of a heterocyclo lower alkyl radical, it may be a saturated or unsaturated hetero group, including piperidino, piperidinyl, pyrrolidinyl, morpholino, morpholinyl, thiomorpholino, thiomorpholinyl, piperazinyl, pyridyl, pyrimidinyl, pyridazinyl, pyrazolyl, quinolyl, isoquinolyl, pyrrolyl, thienyl, furyl, oxazolyl or tetrazolyl groups. In the above formula, it will be understood that, unless otherwise indicated, the lower alkyl or like radicals include both straight and branched chain groups of no more than five carbon atoms.

In a preferred modification of the process for synthesizing the oxoindoles hereof, a dimethylamino Mannich base within general Formula A is utilized as the starting material for other Mannich bases of Formula A having a different amino function.

Although dimethylamine Mannich bases are most advantageous as starting materials for this process, other lower alkylamino Mannich bases as well as heterocyclic bases such as the piperidino Mannich base may also be used.

In the preferred procedure, the Mannich base, which is usually obtained in the form of an acid salt, suitably the hydrochloride, is treated with aqueous ammonia and the free Mannich base isolated from the aqueous mixture. In a suitable mode of isolation, the base is extracted from the reaction mixture with a low boiling, reaction inert, water-immiscible solvent, such as ethyl acetate, diethyl ether, or the like. Upon evaporation of the solvent, the base is taken up in a suitable organic solvent, preferably a non-hydroxylic, polar organic solvent such as acetone, and treated with the quaternizing agent. In the preferred modification, gaseous methyl bromide is used as the quaternizing agent, and is bubbled into the solution of the Mannich base until no further separation of the quaternary is noted. The quaternary salt is then isolated as a residue by filtration, and recrystallized, suitably from a lower alkanol such as methanol.

The quaternary salt has the general Formula C

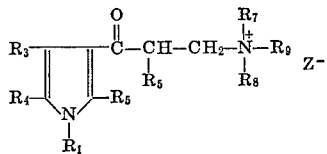

Where $R_1$, $R_2$, $R_3$, $R_4$ and $R_5$ are as above. $R_9$, $R_7$ and $R_8$ are alkyl having from 1 to 8 carbon atoms; however, $R_9$ and $R_7$ may be joined to form a ring containing up to 7 carbon atoms, i.e., the piperidine, pyrrolidine and hexamethyleneimine nuclei; Z is an inorganic radical such as chloride, bromide, sulfate, or the like.

The quaternary salt of the Mannich base, for example, the methobromide, the methiodide, the methosulfate, or the like, is dissolved in water and treated with an excess of an alkali such as aqueous sodium hydroxide, ammonia, or a strong organic base such as triethylamine. The desired vinyl compound of general Formula B separates as a precipitate, and is isolated. The vinyl compound of general Formula B is then purified, preferably by recrystallization from the suitable solvents such as a lower alkanol, preferably ethanol.

The vinyl compounds of general Formula B are then reacted with amines of the general formula X—NH—Y, wherein X and Y have the significance set forth hereinabove, and may thus represent primary amines or secondary acyclic amines.

The reaction of the amine with the compound of Formula B may be carried out in a number of modifications. The preferred mode will depend upon the reactivity and volatility of the respective reactants. Many primary and secondary amines will react with compounds of Formula B at ambient temperature, that is to say, from about 10° C. to about 30° C. with evolution of heat where the reaction is carried out in a solvent such as a lower alkanol, for example, methanol, ethanol, propanol, butanol, and the like, or in di-lower alkyl ketones, for example, acetone, methylethyl ketone, di-isopropyl ketone, and the like, as well as in lower alkyl lower alkanoates such as ethyl acetate, propyl acetate and butyl propionate.

Where desired, the reaction may be carried out in similar solvents under reflux at temperatures of from about 50° to about 150° C. Where it is desired to use low boiling solvents, particularly with volatile amines, the reaction may be advantageously carried out in pressure vessels at temperatures up to about 150° C. In yet another modification of the procedure, it is sometimes advantageous to use excess of the amine base itself as the solvent.

Reaction time varies from one minute to 24 hours, depending upon the nature of the reactants. Most reactions proceed to completion in less than 8 hours.

Among the amines which may be employed in the process of the present invention which may be primary or secondary, may be included those bearing alkyl groups, suitably lower-alkyl groups, such as methyl, ethyl, propyl, and butyl; cycloalkyl groups, such as cyclopropyl and cyclohexyl; alkenyl groups, suitably lower-alkenyl groups, such as allyl, methallyl and hexenyl; alkynyl groups, suitably lower alkynyl groups, such as propynyl, butynyl, and hexynyl groups; or phenyl alkyl groups, suitably phenyl lower-alkyl groups such as benzyl, phenylethyl, and phenylbutyl groups; alkoxy alkyl groups, suitably lower alkoxy lower alkyl groups, such as methoxyethyl, ethoxyethyl, butoxyethyl, pentoxypropyl; hydroxyalkyl groups, suitably hydroxy lower alkyl groups, such as hydroxyethyl, hydroxypropyl, hydroxybutyl, or hydroxyhexyl; dialkylamino, such as dimethylamino.

Also included within the scope of the amines used in this process are primary and secondary amines wherein one of the substituents of the amino moiety corresponds to a radical derived from any of the aforementioned heterocyclic groups, for example, morpholinyl, pyrrolidinyl, thiomorpholinyl, piperazinyl, as well as the unsaturated derivatives thereof, for example, picolyl, tetrazolyl, and the like.

In another modification of the process, the quaternary salt (Formula C) derived from the starting material Mannich base of Formula A may be converted into the desired end product without the isolation of the intermediate methylene compound of Formula B.

In this modification as set forth in Reaction Scheme II, the new organic base, that is to say, the amine, may serve as both the source of alkali and as the reactant. Thus, as set forth in Reaction Scheme II, two moles of the amine are employed. The mole of reaction is the same as that set forth hereinabove.

In another version of this modification, only one mole of the new amine is utilized for each mole of quaternized Mannich base. This version of the reaction depends on its operation upon the shift of equilibrium as the amine portion of the original Mannich base is driven off. For this process to be operative, reaction conditions must be chosen so that the amine to be removed, for example, trimethylamine, has a far greater volatility than both the solvent employed in the reaction and the new amine to be introduced. In the course of the reaction the original amine is removed as a vapor while the solvent and the unreacted new amine remain in the reaction vessel. The mode of reaction is the same as that set forth hereinabove.

The following examples describe preferred embodiments of the novel oxoindoles of this invention.

The temperatures in the following examples are in degrees centigrade.

EXAMPLE 1

4,5,6,7-tetrahydro-2,3-dimethyl-5-propynylaminomethyl-indole

Ten g. of 4,5,6,7-tetrahydro-2,3-dimethyl-5-methylene-4-oxoindole, 10 ml. of propargylamine and 50 ml. of anhydrous ethanol were heated under reflux for 8 hours. The solution was evaporated to dryness under reduced pressure, the residue taken up in 1 N hydrochloric acid, filtered and the solution made alkaline with aqueous ammonia. The precipitated product was filtered, washed with water, dried and crystallized from toluene to yield 4,5,6,7-tetrahydro - 2,3 - dimethyl-4-oxo-5-propynylaminomethyl-indole isolated as the hydrochloride, M.P. 220°.

EXAMPLE 2

Preparation of various oxoindoles from 2-methyl-5-methylene-oxoindoles 3-ethyl-4,5,6,7-tetrahydro-2-methyl-4-oxoindole 14.1 g. (0.08 mole), 9.8 g. dimethylamine hydrochloride (0.12 mole), and 3.6 g. paraformaldehyde (0.12 mole) were refluxed in 200 ml. ethanol for 40 hours. The solution was evaporated to dryness in vacuo on a steam bath and the residue digested with a mixture of 150 ml. water and 10 ml. 2 N HCl. An insoluble residue of unreacted starting material was filtered off. To the acid solution, ammonia water as above was added dropwise with stirring and the amine crystallized out. It was purified by dissolving in 1 N HCl and addition of aqueous ammonia, then by 3 crystallizations from benzene to yield (2.1) 3-ethyl-4,5,6,7 - tetrahydro-2-methyl-4-oxo-5-dimethylaminomethylindole M.P. 170–175°.

Methyl bromide in acetone converted the base into the methobromide salt, M.P. 215–218°. Treatment of the salt with 2 N sodium hydroxide produced 3-ethyl-4,5,6,7-tetrahydro-2-methyl-5-methylene-4-oxoindole, M.P. 217–218°.

When 3-ethyl-4,5,6,7-tetrahydro-2-methyl-5-methylene-4-oxoindole is reacted with the following bases:

methoxyethylamine
ethoxyethylamine
ethylamine
3-morpholinopropylamine
1-hydroxy-2-propylamine
2-hydroxyethylamine
4-picolylamine
3-pyridylamine
N,N-dimethylhydrazine
1-phenyl-2-propylamine
3-piperidylmethylamine
3-dimethylaminopropylamine
N,N-dimethylaminoethylamine
dipropynylamine
dimethallylamine
2-tetrahydropyranylmethylamine
N,N-hexamethylenehydrazine
5-tetrazolylamine
allylamine methallylamine
propynylamine
cyclopropylamine
2,2-diethoxyethylamine
4-aminomorpholine
benzylpropynylamine
4-methoxybenzylamine
2,2-diphenylethylamine
9-aminoacridine
furfurylmethylamine
butylamine
1-adamantanamine
methylpropynylamine the following are produced.
Some of the compounds are purified as their salts.

(2.2) 3-ethyl-4,5,6,7-tetrahydro-5-(2-methoxyethylaminomethyl)-2-methyl-4-oxoindole, M.P. 108–109°.
(2.3) 5-(2-ethoxyethylaminomethyl)-3-ethyl-4,5,6,7-tetrahydro-2-methyl-4-oxoindole, M.P. 101–102°.
(2.4) 3-ethyl-5-(ethylaminomethyl)-4,5,6,7-tetrahydro-2-methyl-4-oxoindole, M.P. 150–151°.
(2.5) 3-ethyl-4,5,6,7-tetrahydro-2-methyl-5-(3-morpholinopropylaminomethyl)-4-oxoindole dihydrobromide, M.P. 154° (dec.).
(2.6) 3-ethyl-4,5,6,7-tetrahydro-5-(1-hydroxy-2-propylaminomethyl)-2-methyl-4-oxoindole, M.P. 172°.
(2.7) 3-ethyl-4,5,6,7-tetrahydro-5-(2-hydroxyethylaminomethyl)-2-methyl-4-oxoindole, M.P. 161–163°.
(2.8) 3-ethyl-4,5,6,7-tetrahydro-2-methyl-4-oxo-5-(4-picolylaminomethyl)indole, M.P. 209–215°.
(2.9) 3-ethyl-4,5,6,7-tetrahydro-2-methyl-4-oxo-5-(3-pyridylaminomethyl)indole, M.P. 185–187°.
(2.10) 3-ethyl-4,5,6,7-tetrahydro-2-methyl-5-(N,N-dimethylhydrazinomethyl)-4-oxoindole hydrobromide, M.P. 202–203.5°.
(2.11) 3-ethyl-4,5,6,7-tetrahydro-2-methyl-4-oxo-5-(1-phenyl-2-propylaminomethyl)indole hydrochloride, M.P. 186–189°.
(2.12) 3-ethyl-4,5,6,7-tetrahydro-2-methyl-4-oxo-5-(3-piperidylmethylaminomethyl)indole, M.P. 142–144°.
(2.13) 5-(3-dimethylaminopropylaminomethyl)-3-ethyl-4,5,6,7-tetrahydro-2-methyl-4-oxoindole hydrobromide, M.P. 165–166°.
(2.14) 5-(2-dimethylaminoethylaminomethyl)-3-ethyl-4,5,6,7-tetrahydro-2-methyl-4-oxoindole hydrobromide, M.P. 168–169.5°.
(2.15) 3-ethyl-4,5,6,7-tetrahydro-2-methyl-4-oxo-5-dipropynylaminomethylindole, M.P. 143–145°.
(2.16) 3-ethyl-4,5,6,7-tetrahydro-5-dimethallylaminomethyl-2-methyl-4-oxoindole.
(2.17) 3-ethyl-4,5,6,7-tetrahydro-5-(2-tetrahydropyranylmethyl)aminomethyl-2-methyl-4-oxoindole, M.P. 135–136°.
(2.18) 3-ethyl-5-(N,N-hexamethylenehydrazinomethyl)-4,5,6,7-tetrahydro-2-methyl-4-oxoindole hydrobromide isopropanolate, M.P. 89–90°.
(2.19) 3-ethyl-4,5,6,7-tetrahydro-2-methyl-4-oxo-5-(5-tetrazolylaminomethyl)indole, M.P. 234°.
(2.20) 5-allylaminomethyl-3-ethyl-4,5,6,7-tetrahydro-2-methyl-4-oxoindole, M.P. 130–131.5°.
(2.21) 3-ethyl-4,5,6,7-tetrahydro-5-methallylaminoethyl-2-methyl-4-oxoindole, M.P. 113°.
(2.22) 3-ethyl-4,5,6,7-tetrahydro-2-methyl-4-oxo-5-propynylaminomethylindole hydrochloride, M.P. 204–204.5°.
(2.23) 5-cyclopropylaminomethyl-3-ethyl-4,5,6,7-tetrahydro-2-methyl-4-oxoindole, M.P. 155–156°.
(2.24) 5-(2,2-diethoxyethyl)aminomethyl-3-ethyl-4,5,6,7-tetrahydro-2-methyl-4-oxoindole, M.P. 95–96°.
(2.25) 3-ethyl-4,5,6,7-tetrahydro-2-methyl-5-[(1-morpholinoamino)methyl]-4-oxoindole, M.P. 137–138.5°.
(2.26) 5-(benzyl-propynylamino)methyl-3-ethyl - 4,5,6,7-tetrahydro-2-methyl-4-oxoindole hydrochloride, M.P. 197–198°.
(2.27) 3-ethyl-4,5,6,7-tetrahydro-5-(4 - methoxybenzyl)-aminomethyl - 2 - methyl-4-oxoindole hydrochloride, M.P. 123–125°.
(2.28) 3-ethyl-4,5,6,7-tetrahydro-2-methyl-4-oxo-5 - (2,2-diphenylethyl)aminomethylindole, M.P. 136–138°.
(2.29) 5-(9-acridinyl)aminomethyl-3-ethyl-4,5,6,7 - tetrahydro-2-methyl-4-oxoindole, M.P. 223–226°.
(2.30) 3-ethyl-5-(furfuryl-methylamino)methyl - 4,5,6,7-tetrahydro-2-methyl-4-oxoindole, M.P. 103–104°.
(2.31) 5-butylaminomethyl-3-ethyl-4,5,6,7-tetrahydro - 2-methyl-4-oxoindole, M.P. 131°.
(2.32) 5-(1-adamantanaminomethyl)-3-ethyl-4,5,6,7 - tetrahydro-2-methyl-4-oxoindole, M.P. 171°.
(2.33) 3-ethyl-4,5,6,7-tetrahydro-2-methyl - 5 - (methylpropynylamino)methyl-4-oxoindole, M.P. 130–130.5°.

EXAMPLE 3

4,5,6,7-tetrahydro-2-methyl-4-oxo-3-propyl-5-propynylaminomethylindole hydrochloride 5 - dimethylaminomethyl-4,5,6,7-tetrahydro-2-methyl-4-oxo-3-propylindole was prepared from 4,5,6,7-tetrahydro-2-methyl-4-oxo-3 - propylindole, dimethylamine hydrochloride and paraformaldehyde, followed by treatment with base as described in Preparation 1, Route 1. It was transformed into the methobromide, M.P. 221–222°. Treatment with 2 N sodium hydroxide gave the methylene compound, M.P. 179–181°, which, in turn, reacted with propynylamine to produce the final product 4,5,6,7-tetrahydro - 2-methyl-4-oxo-3-propyl-5-propynylaminomethylindole hydrochloride. ¼H₂O, M.P. 175–179°.

The active compounds of this invention may be taken in tablets or capsules in doses of 1–100 mg., in syrup at 0.5–20 mg./ml. concentration, in 1–50 mg. suppositories or by parenteral injection in 0.5–50 mg./ml. concentration. More particularly, the oxoindoles hereof may be formulated in the same manner as the oxoisoindoles identified in the following examples.

EXAMPLE 4

| Ingredients: | Mg./tablet |
|---|---|
| 4,5,6,7 - tetrahydro - 1,3 - dimethyl-5-dimethylaminoethyl-4-oxoisoindole hydrochloride | 10 |
| Lactose USP (spray dried) | 170 |
| Starch USP | 10 |
| Magnesium stearate USP | 1 |
| Flavor | q.s. |

All above ingredients were passed through a 60-mesh sieve, blended for 30 minutes and compressed directly into tablets on a suitable tablet press at a weight of 191 mg., using a $^{11}\!/_{32}''$ biconcave scored punch.

EXAMPLE 5

| Ingredients: | Mg./suppository |
|---|---|
| 4,5,6,7 - tetrahydro-1,3-dimethyl-5-morpholinomethyl-4-oxoisoindole hydrochloride (mg.) | 100 |
| Cocoa butter | q.s. |

The drug and cocoa butter are combined, mixed thoroughly and formed into 2 gram suppositories.

EXAMPLE 6

| Ingredients: | Mg./capsule |
|---|---|
| 4,5,6,7 - tetrahydro - 1,3-dimethyl-4-ozo-5-piperidinomethylisoindole hydrochloride | 20 |
| Lactose USP | 100 |
| Magnesium stearate | 1 |
| Amorphous silicon dioxide (Cab-O-Sil) | 5 |

These ingredients were combined, blended and passed through a No. 1 screen of Fitzpatrick comminutor machine before encapsulating into a two-piece hard gelatin No. 3 capsule on a standard capsulating machine at a net weight of 126 mg.

EXAMPLE 7

| Ingredients: | Mg./ml. |
|---|---|
| 4,5,6,7-tetrahydro-1,2,3-trimethyl - 5 - dimethylaminomethyl-4-oxoisoindole hydrochloride | 5 |
| Sodium chloride | (1) |
| Methylparaben USP (mg.) | 1.8 |
| Propylparaben USP (mg.) | 0.2 |
| Water | q.s. |

¹ Q.s. for isotonicity.

The above ingredients are combined in sterile solution for parenteral use.

EXAMPLE 8

| Ingredients: | Grams/liter |
|---|---|
| 4,5,6,7 - tetrahydro-1-methyl-5-dimethyl-aminomethyl - 4 - oxo-3-phenylisoindole hydrochloride | 10 |
| Granulated sugar | 600 |
| Flavor | q.s. |
| Color | q.s. |
| Sodium benzoate | 1 |
| Deionized water | q.s. |

All above ingredients are dissolved in water, combined and made up to a volume of one liter.

PREPARATION I

The 4,5,6,7 - tetrahydro - 2,3-dimethyl-5-methylene-4-oxoindole was prepared by two routes:

Route 1.—4,5,6,7 - tetrahydro-2,3-dimethyl-4-oxoindole (163 g., 1 mole), 81.5 g. dimethylamine hydrochloride (1.0 mole), and 45 g. of paraformaldehyde (1.5 mole) were heated under reflux in 2500 ml. of ethanol. After 8 hours, 10 g. of paraformaldehyde was added, and after 24 hours, another 10 g. After 48 hours under reflux, 1200 ml. of ethanol was distilled and the resulting mixture was cooled. 4,5,6,7-tetrahydro-2,3-dimethyl-5-dimethylaminomethyl-4-oxoindole hydrochloride crystallized and was collected; M.P. after crystallization from ethanol, 230°.

The salt was converted into the base with aqueous ammonia and 51 g. thereof was dissolved in 350 ml. isopropanol, and methyl bromide gas bubbled through the solution. The temperature of the solution rose to about 45° and within a few minutes the methobromide crystallized. Addition of methyl bromide was continued for 40 minutes until the precipitate did not increase any more. After standing several hours at room temperature, the crystals were filtered off, washed with isopropanol, dried (yield 70 g.) and crystallized from a mixture of anhydrous methanol and ethanol, M.P. 222°.

The methobromide (10 g.) was dissolved in a mixture of 50 ml. of ethanol and 50 ml. of water. Upon addition of 20 ml. of normal aqueous sodium hydroxide, a yellow solid separated. It was filtered, washed with water and recrystallized to give the methylene compound, M.P. 197–198°.

Similarly, but starting with 4,5,6,7-tetrahydro-2-methyl-3-phenyl-4-oxoindole phenyl and 2-butyl-3-methyl-4-oxoindole there are produced the corresponding 4,5,6,7-tetrahydro - 2-methyl-3-phenyl-5-dimethylaminomethyl-4-oxoindole and 4,5,6,7-tetrahydro-2-butyl-3-methyl-5-dimethylaminomethyl-4-oxoindole, M.P. 182–183° and 138.5–139.5°, respectively.

Route 2.—4,5,6,7-tetrahydro-2,3-dimethyl-4-oxoindole (16.3 g., 0.10 mole) was heated to reflux with 10.7 g. of paraformaldehyde (0.15 mole) and 14.5 g. of piperidine hydrochloride (0.12 mole) in 250 ml. ethanol. After 8 hours, another 1 g. of paraformaldehyde was added and refluxing continued for a total of 48 hours. The solution was evaporated to dryness in vacuo on a steam bath, the residue taken up in 150 ml. water to which 10 ml. of 2 N hydrochloric acid had been added and the solution freed from an insoluble residue (unchanged starting material) by filtration. The filtrate was made alkaline with ammonia water, whereupon a white solid precipitated. This was filtered, washed with water, dried at 80° and crystallized several times from benzene followed by crystallization from benzene-heptane. The 4,5,6,7-tetrahydro-2,3-dimethyl-4-oxo-5-piperidinomethylindole, M.P. 179°, thus obtained was dissolved in acetone and treated with excess methyl iodine. The methiodide salt, M.P. 219–220° crystallized upon standing overnight. Treatment with alkali is described for Route 1 produced the methylene compound, M.P. 197–198°.

We claim:
1. A compound having the formula

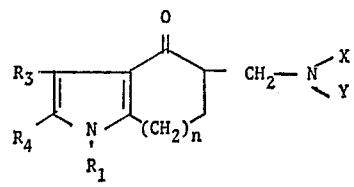

wherein
  $n$ is 1, or 2;
  $R_1$, $R_3$ and $R_4$ are hydrogen or lower alkyl;
  X is hydrogen, lower alkyl, hydroxy-lower alkyl, alkoxy-lower alkyl, dimethylamino-lower alkyl, phenyl-lower alkyl, cycloalkyl, lower alkenyl, or lower alkynyl;
  Y is hydrogen, cycloalkyl, lower alkenyl, lower alkynyl, di(lower alkyl) amino, a heterocyclic radical or a heterocyclo-lower alkyl radical; and
  when Y is a heterocyclic radical or a heterocyclo lower alkyl radical, the heterocycle is piperidino, piperidinyl, hexamethylenimino, pyrrolidinyl, morpholino, thiomorpholino, pyridyl, thienyl, furyl, tetrahydropyranyl, or tetrazolyl group, the lower alkyl moieties of which groups contain no more than 5 carbon atoms; and the pharmaceutically acceptable acid addition salts thereof.

2. A compound according to claim 1, having the designation 5-cyclopropylaminomethyl-3-ethyl-4,5,6,7-tetrahydro-2-methyl-4-oxoindole; and the pharmaceutically acceptable acid addition salts thereof.

3. A compound according to claim 1, having the designation 3-ethyl-4,5,6,7-tetrahydro-2-methyl-4-oxo-5-propynylaminomethylindole; and the pharmaceutically acceptable acid addition salts thereof.

4. A compound according to claim 1, having the designation 3-ethyl-4,5,6,7-tetrahydro-2-methyl-5-(N-methyl-N-propynylamino) methyl-4-oxoindole; and the pharmaceutically acceptable acid addition salts thereof.

References Cited

UNITED STATES PATENTS 3,491,093  1/1970  Pachter et al. _____ 260—247.5

ALEX MAZEL, Primary Examiner

J. A. NARCAVAGE, Assistant Examiner

U.S. Cl. X.R.

260—243 B, 247.5 B, 250 A, 256.4 N, 268 BC, 288 R, 296 B, 307 R, 310 R, 308 D, 326.3, 326.5 J, 326.5 G; 424—247, 250, 258, 263, 267, 274